United States Patent [19]

Shaw

[11] Patent Number: 4,870,520
[45] Date of Patent: Sep. 26, 1989

[54] READ/WRITE HEAD WITH SIDE WINDING SLOT

[75] Inventor: Stephen H. Shaw, Hopkins, Minn.

[73] Assignee: Magnetic Peripherals Inc., Minneapolis, Minn.

[21] Appl. No.: 182,609

[22] Filed: Apr. 18, 1988

Related U.S. Application Data

[63] Continuation of Ser. No. 868,085, May 29, 1986, abandoned.

[51] Int. Cl.[4] ............................ G11B 5/60; G11B 5/17
[52] U.S. Cl. ....................................... 360/103; 360/123
[58] Field of Search ............... 360/103, 102, 105, 106, 360/123

[56] References Cited

U.S. PATENT DOCUMENTS

| | | | |
|---|---|---|---|
| 3,158,847 | 11/1964 | Pulkrabek | 340/174.1 |
| 3,237,280 | 3/1966 | Manders | 29/155.5 |
| 3,238,603 | 3/1966 | Curtis et al. | 29/155.5 |
| 3,292,169 | 12/1966 | D'Alessandro et al. | 340/174.1 |
| 3,573,768 | 4/1971 | Harris | 360/103 |
| 4,293,883 | 10/1981 | Cox et al. | 360/103 |
| 4,402,025 | 8/1983 | Anderson et al. | 360/98 |
| 4,419,705 | 12/1983 | Brower et al. | 360/103 |
| 4,506,307 | 3/1985 | Watrous | 360/106 |
| 4,514,776 | 4/1985 | Koyama et al. | 360/121 |
| 4,607,307 | 8/1986 | Sieben | 360/132 |
| 4,636,900 | 1/1987 | Tung et al. | 360/103 |
| 4,661,872 | 4/1987 | Saito | 360/104 |

FOREIGN PATENT DOCUMENTS

| | | | |
|---|---|---|---|
| 146217 | 6/1985 | European Pat. Off. | 360/103 |
| 56-153558 | 11/1981 | Japan | 360/103 |
| 58-100274 | 6/1983 | Japan | 360/103 |
| 60-131613 | 7/1985 | Japan | 360/103 |
| 61-74103 | 4/1986 | Japan | 360/103 |
| 61-82372 | 4/1986 | Japan | 360/103 |
| 61-206917 | 9/1986 | Japan | 360/103 |
| 619955 | 8/1978 | U.S.S.R. | 360/103 |

Primary Examiner—John H. Wolff
Assistant Examiner—Matthew J. Bussan
Attorney, Agent, or Firm—Bill D. McCarthy; Edward P. Heller, III

[57] ABSTRACT

A read/write head for use in a disk drive and including a head body having a vertically extending core slot that extends longitudinally from a front surface of the head body in near proximity to one side thereof. A side winding slot extends horizontally from the same side to the front surface of the head body at a predetermined angle. A ferrite core member is disposed within the core slot to support a core winding in the side winding slot.

8 Claims, 2 Drawing Sheets

READ/WRITE HEAD WITH SIDE WINDING SLOT

CROSS REFERENCE TO RELATED APPLICATION

This is a continuation application to United States Patent Application entitled READ/WRITE HEAD WITH TRANSVERSE WINDING SLOT, Ser. No. 868,085, filed May 29, 1986 and now abandoned.

BACKGROUND OF THE INVENTION

1. Field of the Invention

The present invention relates to read/write heads used within computer disk drives and the like, and more particularly but not by way of limitation, to magnetic heads with ferrite cores disposed adjacent a side surface of the head in a winding slot.

2. Discussion of Related Art

In the use of highspeed disk drives, read/write heads have been configured to have an aerodynamic shape such that the heads float or "fly" above the surface of the spinning disks. With the advance of disk drive technology it has been been found that read/write heads with a ferrite core disposed adjacent one surface of the head are preferable in certain applications. One advantage of this head design is that placement of the core in close proximity to a side edge of the head makes more of the outer periphery of the disk available for data storage.

Such prior art read/write heads usually include a transverse slot extending across the entire width of the head body to provide clearance for the core winding adjacent the end of the head arm connected to the head body. This is depicted in the accompanying drawings by the bottom plan view of a typical prior art read/write head shown in FIG. 1. An example of such a prior art head is taught in Japanese Patent Document No. 10 74103. It has been found that the core winding can contact the head arm and thereby cause an electrical short, resulting in an inoperative read/write head.

Another disadvantage of the above described prior art magnetic heads is that the transverse slot provided for the coil winding can substantially weaken the head to the extent that the manufacturing process necessary to complete the head, such as lapping same to comply with the critical specification dimensions required for stable performance, is very difficult. The reason for this is that the heads are often very small, sometimes less than 0.050 inches thick, and a transverse slot sufficiently large to receive the coil winding can diminish the effective thickness of the head, making increased head thickness, also objectionable, the only way to maintain adequate head strength.

Another disadvantage of the read/write heads described above is that the read/write heads are configured to operate either above the top or below the bottom of the disk surface; that is, two separate read/write head configurations are required because of the necessity of placing the aerodynamically configured rails on one surface to permit the read/write head to "fly" away from the surface of the spinning disk.

There exists a need for a read/write head that eliminates the problems of core winding shorting against the head arm while retaining adequate head strength. Further, there is a need for a read/write head that can be utilized for both above and below disk applications. U.S. Pat. Nos. 3,158,847 to Polkrabek, 3,292,168 to D'Alessandro et al., 4,506,307 to Watrous and 4,514,776 to Koyama et al. disclose various configurations of read/write heads for use with disk drives and the like. While such read/write heads accomplish certain of the same functions as that of the present invention, none includes an off-center vertical slot and an angled horizontal slot into which is inserted a transducer core. U.S. Pat. Nos. 3,237,280 to Manders, 3,238,603 to Curtis et al. and 4,402,025 to Anderson et al. disclose read/write heads each of which includes an angled slot to retain a transducer core; however, none of these patents discloses an off-center vertical slot and an angled horizontal slot into which is inserted as transducer core. These features are significant in overcoming the disadvantages of the prior art read/write heads.

SUMMARY OF THE INVENTION

The present invention provides a read/write head for use with a disk drive and includes a head body with a vertical core slot extending longitudinally from a front surface of the head into the head body adjacent a side surface thereof. A side winding slot extends horizontally from the side surface to the front surface of the body, and a core is disposed within the vertical core slot. The winding on the core extends into the side winding slot.

The head body of the present invention, instead of having a transverse horizontal slot extending from side to side of the head body, has an angled side slot to provide adequate space to encompass the coil winding and to space the winding from the support arm.

Further, the head body of the present invention can be manufactured with identical top and bottom surfaces, including aerodynamically configured rail portions thereof.

An object of the present invention is the provision of an improved read/write head for use with a disk drive and which includes a side disposed core and an improved winding slot which facilitates enclosure of the core winding while providing a stronger head.

Another object of the present invention, while achieving the above stated object, is to provide a read/write head with an improved core and winding slot arrangement to reduce electrical shorting potential.

Yet another object of the present invention, while achieving the above stated objects, is to provide a read/write head with symmetrical top and bottom surfaces so that the head can be used for either an above disk or below disk application.

Other objects, features and advantages of the present invention will become clear from the following detailed description of the drawings when read in conjunction with the accompanying drawings and appended claims.

DESCRIPTION

The present invention provides a read/write head for use within a disk drive and which comprises a head body having a vertical core slot adjacent a side surface of the body extending longitudinally from a front surface into the body. A horizontal side winding slot extends from a side surface to the front surface of the head body, and a core is disposed within the vertical core slot. A core supported winding extends into the side winding slot.

Figure 1:
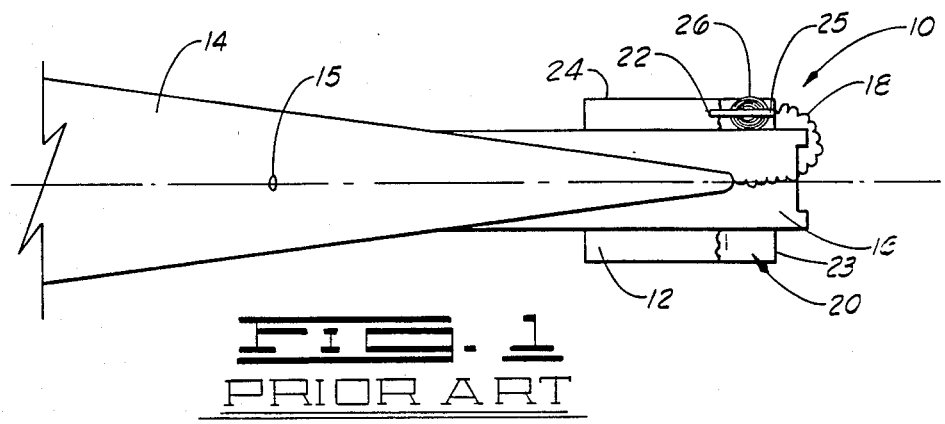
FIG. 1 is a partially cutaway bottom plan view of a prior art read/write-head connected to a support arm.

As described hereinabove, prior art read/write heads have serious shortcomings. For a better understanding of the novelty of the present invention, a brief description will be made of a typical prior art read/write head. FIG. 1 is a view of such a prior art read/write head 10 which includes a head body 12 bonded, or connected to, a horizontally extending head support arm 14. For convenience of description herein, the terms horizontal and vertical will be used, and these terms will assume that the disposition of the read/write heads discussed herein are such that the longitudinal axis of the support arm 14 is in a horizontal position. That is, with longitudinal axis 15 of the support arm 14 extending horizontally, the vertical direction relative thereto will be readily established for reading and understanding clarity.

An outer portion of the support arm 14 is usually in the form of a metallic support platform 16 from which electrical connectors or wires 18 extend for connection to the read/write head body 12. The head body 12 is partially removed to show a winding slot 20 which extends horizontally through the head body 12. A vertical core slot 22 extends from a front surface 23 of the head body 12 adjacent a horizontal surface or edge 24 thereof. Disposed within the vertical core slot 22 is a planar ferrite core 25 which has an opening therein (not shown) through which is wrapped a coil of wire or a winding 26 connected to the wires 18. The manufacture of a read/write head 10 as shown in FIG. 1 has proven to be more costly than desired, but more significantly, the winding 26 is difficult to install and the winding often touches the metallic support 16 which shorts out the read/write head 10. Further, the side to side extension of the winding slot 20 significantly weakens the head body 12 such that there is afforded a greater opportunity for an out of flat condition of the upper and lower surfaces thereof, often leading to unpredictable, and therefore unacceptable, flying characteristics of the head body.

Figure 2:
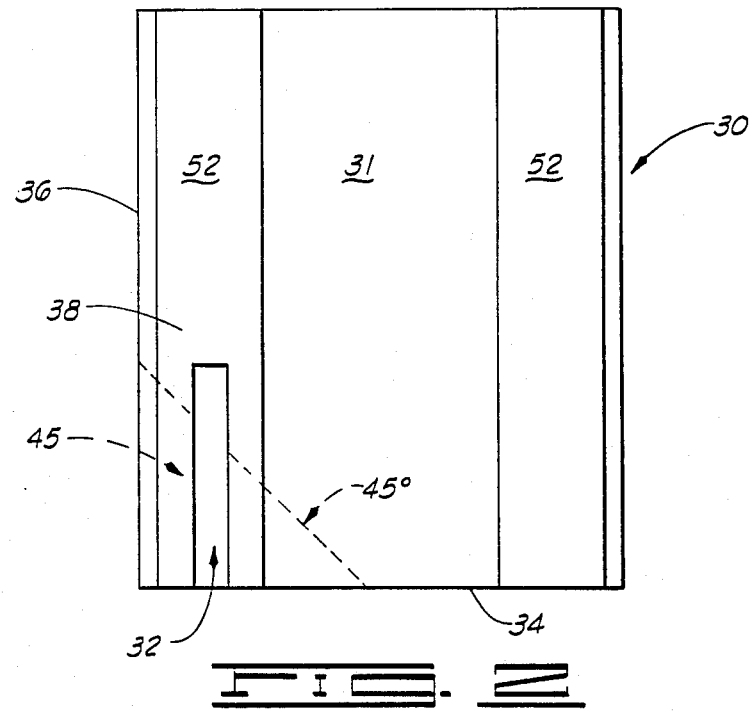
FIG. 2 is a top plan view of a read/write head constructed in accordance with the present invention.
Figures 3A, 3B:
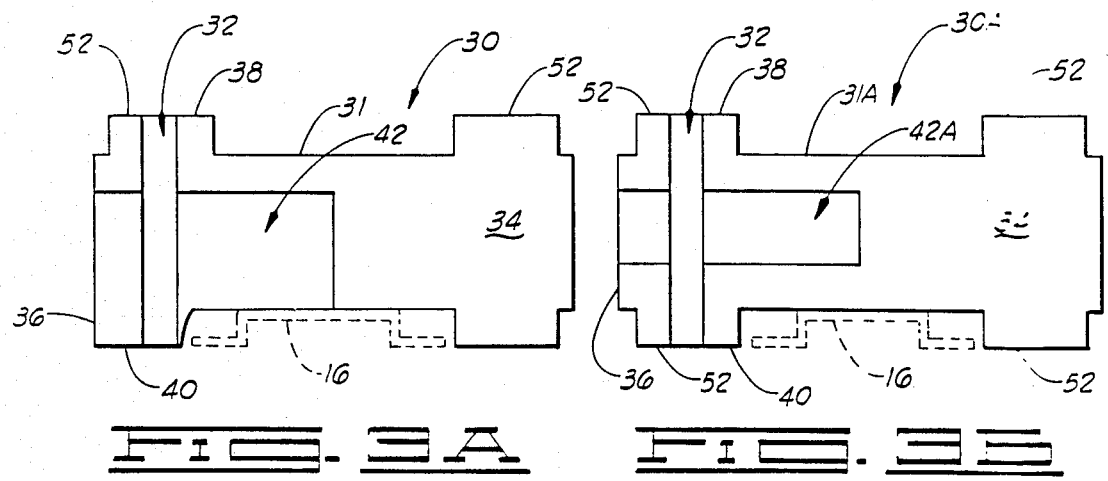
FIG. 3A is a front elevational view of the read/write head of FIG. 2.
FIG. 3B is a front elevational view of another read/write head constructed in accordance with the present invention.

Referring now to FIGS. 2 and 3A, a read/write head 30 of the present invention includes a head body 31 that can be of any suitable configuration or shape, including cylindrical, disk, or square, but for the purpose of manufacturing, it is preferably rectangularly shaped. The head body 31 can be formed from any suitable material including plastic, graphite composite, ceramic or coated nonferrous metal. The head body 31 includes a vertical core slot 32 that extends longitudinally from a front surface 34 into the head body 31 adjacent a vertical side surface 36 thereof; that is, the core slot 32 is located off center in the head body 31 and is disposed in close proximity to the vertical side surface 36 as shown for the reason stated hereinabove, that more of the outer periphery of the disk is available for data storage. The vertical core slot 32 can extend completely through an upper surface 38 and a lower surface 40, or through only one such surface as desired.

Figure 4:
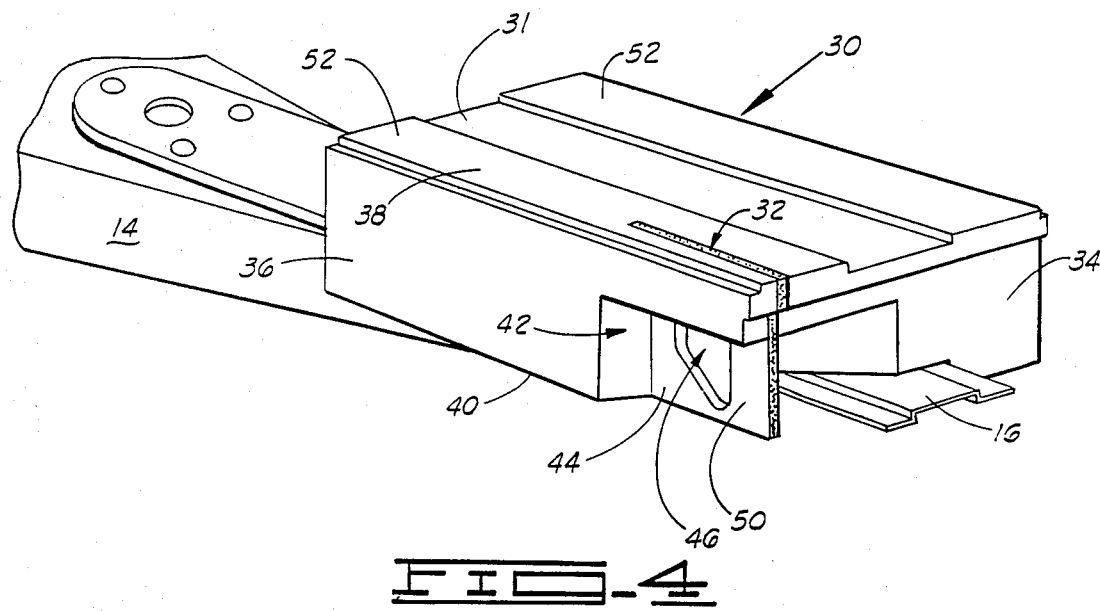
FIG. 4 is a perspective view of the read/write head of FIG. 2 as same is provided with a core and mounted on a support arm.
Figure 5:
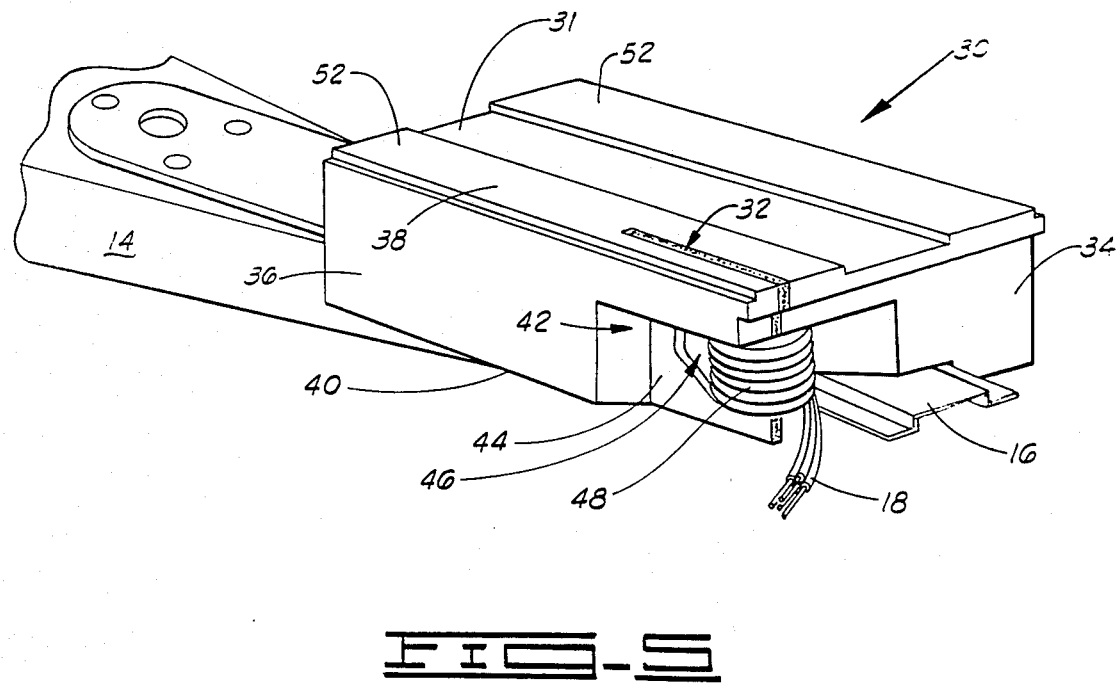
FIG. 5 is a perspective view of the read/write head of FIG. 4 wherein the core is provided with a winding.

One of the novel features of the present invention is a side winding slot 42 that extends horizontally from the side surface 36 to the front surface 34 to intersect the core slot 32 as shown most clearly in FIGS. 3A, 4 and 5. The side winding slot 42 can extend through the upper surface 38, or through the lower surface 40 as shown in FIG. 3A. Also, the side winding slot 42 can be centered in the head body 31, as will be described later with reference to FIG. 3B. The interior surface of the side winding slot 42 can be of any desired shape, but for ease of manufacturing and head balance, the interior surfaces of the side winding slot 42 are planar and extend vertically. Also, the interior surfaces of the side winding slot 42 can be curved, when viewed from above, or the side winding slot 42 can be notched from a side surface to extend into the interior of the head body 31. Preferably, again for ease of manufacturing and head balance, the interior surfaces of the side winding slot 42 define parallel planes. The angle with which the side winding slot 42 intersects the surfaces 34 and 36 can vary, but for the purpose of the present discussion, a 45 degree angle as indicated in FIG. 2 will be assumed. That is, it has been determined that an angle of approximately 45 degrees for the side winding slot 42 provides sufficient space to receive the winding supported by the core, while at the same time minimizing the amount of material removed in the formation of the side winding slot 42. The latter mentioned feature is important in maintaining the strength or stiffness of the head body 31, which in turn leads to better dimension control in the manufacturing processes, such as surface lapping, required to form the read/write head 30. Further, this angle is adequate to achieve the above mentioned goals while retaining an adequate support grip on the core via the portion of the core slot 32 which remains following material removal in forming the side winding slot 42.

As shown in FIG. 4, a flux detector and creator of the type called a core 44 is disposed within the core slot 32. The core 44 is a generally thin, planar shaped member and is made from a ferrite material or the like. The core 44 has a winding opening or bore 46 extending transversely therethrough which is accessible by virtue of the side winding slot 42 for accepting a coil winding 48. The winding opening 46 can be of any desired shape, but for ease of winding the wire of the coil winding 48, at least one vertical edge is desired, preferably parallel to the front surface 34 to define a vertical edge member 50. It will be noted that the head body 31 has aerodynamic surfaces 52 along its upper surfaces 38.

As shown in FIG. 5, the coil winding 48 is vertically wound rather than horizontally as found in some prior art heads, and is substantially disposed within the side winding slot 42 near the vertical side surface 36 of the head body 31. The presence of the core 44, with its coil winding 48, serves to stiffen or strengthen the corner of the head body 31 in the vicinity of the side winding slot 42, and since the side winding slot 42 does not extend completely across the width of the head body 31, the head body 31 has retained most of the strength that it had prior to removal of the material necessary to form the side winding slot 42.

Further, the coil winding 48 is suitably spaced away from the metallic support 16 so as to minimize shorting problems. Other advantages of the configuration of the read/write head 30 are as follows: the core 44 is easier to wind, thereby reducing associated manufacturing costs; the core 44 is easier to install in the head body 31; the core 44 is easier to glase and insulate; the head body 31 provides an increased area for the width of the coil winding 48, resulting in improved electrical performance; the head body 31 provides better balance and flying characteristics; and the head body 31 is stronger since the side winding slot 42 is confined only to the vicinity of the core 44 and sized as necessary to receive the coil winding 48.

An alternate embodiment of the present invention that eliminates the need for two separate head configurations for above and below disk applications is shown in FIG. 3B wherein a head 30A is shown. The head/write head 30A has a head body 31A having its upper surface 38 identical to its lower surface 40. Both surfaces 38, 40 have aerodynamic surfaces or "rails" 52 that create the aerodynamic forces necessary for the head to "fly" above the spinning disk. As shown in FIG. 3B, the core slot 32 extends through the upper surface 38 and the lower surface 40, and the head body 31A is balanced and symmetrical about its horizontal central axis. An interior side winding slot 42A extends horizontally and is centered in the head body 31A along the horizontal central axis of the head body 31A. The side winding slot 42A extends from the front surface 34 to the side surface 36 in the manner of the side winding slot 42 in the above described head body 31 except that the side winding slot 42A does not intersect any horizontal exterior surface. Further, the horizontal distance between the rails 52 is established to be great enough to permit connection or bonding with the metallic support platform 16 between the lower pair of rails 52.

An advantage of the head body 31A is that it is symmetrical about its horizontal central axis, and it therefore can be rotated 180 degrees to be used for top or bottom head installation. This symmetry eliminates the need to have separate head bodies for these installations, and thus separate machining is not required for making top and bottom head bodies. The head body 31A also provides improved balance due to its symmetry and improved ceramic (sauriesan) application.

It is clear that the present invention is well adapted to carry out the objects and to attain the ends and advantages mentioned herein as well as those inherent in the invention. While the presently preferred embodiment of the invention has been described for purposes of this disclosure, numerous changes can be made which will readily suggest themselves to those skilled in the art and which are accomplished within the spirit of the invention disclosed and as defined by the appended claims.

What is claimed is:

1. An improved read/write head for support on a read/write head arm support in a disk drive in which the read/write head is disposed above or below a horizontally rotating disk, the read/write head comprising:
   a head body substantially rectangular in configuration and having vertically extensive front and side surfaces, the head body having a vertically extensive core slot disposed in near proximity to one selected side surface and extending longitudinally from the front surface of the head body, and the head body, and the head body having a side winding slot extending from the selected side surface so that the side winding slot intersects only the front surface of the head body and the core slot;
   a core member supported by the core slot and extensive into the intersection of the core slot and the side winding slot, the core member having a winding bore disposed in the intersection of the core slot and the side winding slot; and
   a winding supported by the core member extending through the winding bore and disposed substantially within the side winding slot.

2. The read/write head of claim 1 wherein the head body includes at least one longitudinally extending flying rail.

3. The read/write head of claim 1 wherein the head body is characterized as having upper and lower horizontal surfaces and wherein the configuration of the upper horizontal surface is identical to the configuration of the lower horizontal surface.

4. The read/write head of claim 2 wherein the head body is characterized as having at least one exterior horizontal surface which is adapted for connection to the read/write head arm support.

5. The read/write head of claim 1 wherein the head body is characterized as having upper and lower exterior horizontal surfaces, and the core slot extends vertically through the upper and lower exterior horizontal surfaces of the head body.

6. The read/write head of claim 1 wherein the side winding slot extends horizontally at an angle of approximately 45 degrees from the selected side surface of the body.

7. The read/write head of claim 1 wherein the side winding slot extends through at least one exterior horizontal surface of the body.

8. The read/write head of claim 3 wherein the side winding slot is disposed along the horizontal central axis of the head body so that the head body is symmetrical about its horizontal central axis.

* * * * *

UNITED STATES PATENT AND TRADEMARK OFFICE
CERTIFICATE OF CORRECTION

PATENT NO. : 4,870,520
DATED : September 26, 1989
INVENTOR(S) : Stephen H. Shaw

It is certified that error appears in the above-indentified patent and that said Letters Patent is hereby corrected as shown below:

Column 6, lines 10-11, delete "and the head body,".

Signed and Sealed this

Fifth Day of April, 1994

Attest:

BRUCE LEHMAN

*Attesting Officer*  *Commissioner of Patents and Trademarks*